(12) United States Patent
Sendijarevic

(10) Patent No.: US 6,750,260 B2
(45) Date of Patent: Jun. 15, 2004

(54) PROCESS FOR CHEMICAL RECYCLING OF POLYURETHANE-CONTAINING SCRAP

(75) Inventor: Vahid Sendijarevic, Troy, MI (US)

(73) Assignees: Troy Polymers, Inc., Troy, MI (US); Polyventure, Inc., Southfield, MI (US)

( * ) Notice: Subject to any disclaimer, the term of this patent is extended or adjusted under 35 U.S.C. 154(b) by 226 days.

(21) Appl. No.: 09/796,126

(22) Filed: Feb. 28, 2001

(65) Prior Publication Data

US 2002/0010222 A1 Jan. 24, 2002

Related U.S. Application Data

(60) Provisional application No. 60/185,228, filed on Feb. 28, 2000.

(51) Int. Cl.$^7$ ................................................. C08J 11/04
(52) U.S. Cl. ............................. 521/49; 521/40; 521/48; 521/48.5; 521/49.5
(58) Field of Search ......................... 521/40, 48, 48.5, 521/49, 49.5

(56) References Cited

U.S. PATENT DOCUMENTS

| | | | |
|---|---|---|---|
| 2,937,151 A | 5/1960 | Broeck | 260/2.3 |
| 3,300,417 A | 1/1967 | McElroy | 260/2.3 |
| 3,404,103 A | 10/1968 | Matsudaira et al. | 260/2.3 |
| 3,632,530 A | 1/1972 | Kinoshita | 260/2.3 |
| 3,708,440 A | 1/1973 | Frulla et al. | 260/2.3 |
| 3,738,946 A | 6/1973 | Frulla et al. | 260/2.3 |
| 3,983,087 A | 9/1976 | Tucker et al. | 260/2.3 |
| 4,044,046 A | 8/1977 | Kondo et al. | 260/471 |
| 4,110,266 A | 8/1978 | Sheratte | 260/2.3 |
| 4,159,972 A | 7/1979 | Braslaw et al. | 260/2.3 |
| 4,316,992 A | 2/1982 | Gerlock et al. | 568/621 |
| 5,274,004 A | 12/1993 | van der Wal | 521/49.5 |
| 5,300,530 A * | 4/1994 | Machado | 521/49 |
| 5,357,006 A | 10/1994 | Gassan et al. | 525/453 |
| 5,443,157 A | 8/1995 | Baker et al. | 209/12.1 |
| 5,556,889 A | 9/1996 | Naber et al. | 521/49.5 |
| 5,635,542 A | 6/1997 | Munzmay et al. | 521/49.5 |
| 5,689,012 A * | 11/1997 | Pazos | 568/619 |
| 5,726,277 A * | 3/1998 | Salsman | 528/272 |
| 5,753,086 A | 5/1998 | Guffey et al. | 202/88 |
| 6,020,386 A | 2/2000 | Munzmay et al. | 521/49.5 |
| 6,024,226 A | 2/2000 | Olivier | |
| 6,069,182 A | 5/2000 | Naber et al. | 521/47 |
| 6,077,978 A * | 6/2000 | McDaniel | 568/620 |

OTHER PUBLICATIONS

International Search Report relating to counterpart International application No. PCT/US01/06560.
Chemical Week, "Survey Reveals Pop in Polyurethane Markets", p. 33, Aug. 6, 1997.
BASF news release, "BASF, Philip Services Polyurethane Recovery Plant . . . ", Sep. 16, 1997.
Polyurethane 1995, "Recycling and Recycled Content for Polyurethane Foam", Sep. 26–29, 1995.
Polyurethane Handbook, G. Oertel, Hanser Publishers, pp. 16–18, 39–41, 1985.
Flexible Polyurethane Foams, Herrington & Hock, Dow Plastics, pp. 2.5–2.10, 1991.
Polyuretane Elastomers, Hepburn, Applied Science Publ., pp. 6, 7, 18–26, 1982.
Polymer Recycling, Scheirs, John Wiley & Sons, pp. 354–377, 1998.
Blair, "TDI–Based, High Resiliency Automotive Cushioning . . . ", 1995 Polymer Institute.
Rasshofer et al., "Automotive Polyurethanes–Advances in Plastics Recycling", vol. 2, pp. 66–129 (2001).

* cited by examiner

Primary Examiner—Edward J. Cain
(74) Attorney, Agent, or Firm—Brooks & Kushman P.C.

(57) ABSTRACT

A process of chemically recycling polyurethane-containing scrap. Polyurethane-containing scrap is subjected to a chemolysis reaction to produce chemolysis polyol products. The chemolysis polyol products are used as initiators in a reaction with alkylene oxide to produce oxyalkylated polyols for preparing polyurethanes.

21 Claims, 2 Drawing Sheets

Process for Chemical Recycling of "Light ASR"

PROCESS FOR CHEMICAL RECYCLING OF POLYURETHANE-CONTAINING SCRAP

CROSS-REFERENCE TO RELATED APPLICATION

This application claims the benefit of Provisional application Ser. No. 60/185,228, filed Feb 28, 2000, and entitled "Process For Chemical Recycling of Polyurethane-Containing Scrap."

FIELD OF THE INVENTION

This invention relates in general to chemical recycling processes, and in particular to a process for the chemical recycling of polyurethane-containing scrap, such as light fraction separated from automotive shredder residue (hereinafter referred to as "light ASR") or flexible foam separated from automotive shredder residue. The invention also relates to novel polyol products, produced by the process, for preparing polyurethanes.

BACKGROUND INFORMATION

It is well known in the art that chemolysis processes such as glycolysis, hydrolysis, and aminolysis can be used for depolymerization and recycling of polyurethane scrap, as well as condensation polymers such as polyesters (e.g., PET), polyamides (e.g., nylons), and polyureas (e.g., RIM, RRIM, SRIM). Major differences between glycolysis, hydrolysis, and aminolysis are in the type of reactant utilized for depolymerization and the composition of final products. In the case of hydrolysis, water is utilized for decrosslinking of the polymer, requiring a relatively high reaction pressure and temperature. The hydrolysis of polyurethanes is usually carried out at temperatures higher than 200° C. and pressures higher than 16 bars (230 psi). The hydrolysis products are original polyols and amines (isocyanate derivatives). Glycolysis can be carried out at atmospheric pressure at about 200° C. (between 180° and 240° C.). Gycolysis products are original polyols, isocyanate-containing polyols, and residual glycolytic agents (reactants). Aminolysis can be carried out at atmospheric pressure and temperature much lower than that required for glycolysis. Aminolysis products are disubstituted ureas and original polyols.

Representative of the chemolysis technology are U.S. Pat. Nos. 2,937,151; 3,300,417; 3,404,103; 3,632,530; 3,708,440; 3,738,946; 3,983,087; 4,044,046; 4,110,266; 4,159,972; 4,316,992; 5,300,530; 5,357,006; 5,556,889; 5,635,542; and 6,020,386. A recent review of chemolysis processes, and more specifically glycolysis, has been published by Rasshofer, W. and Weigand, E. ["Automotive Polyurethanes—Advances in Plastics Recycling," Volume 2, (2001), Technomic Publishing Co., Inc., Lancaster, Pa. 17604, USA, pp.66–129].

Most of the chemolysis products are described to be used in polyurethanes without any modification or with a minimum modification. Practically all chemolysis processes including glycolysis result in amine formation which greatly affects the reactivity of the chemolysis products with isocyanates. U.S. Pat. No. 6,020,386 describes addition of a dialkyl carbonate and/or 1,3-dicarbonyl compound to the resultant alcoholysis product. U.S. Pat. No. 5,635,542 describes addition of 1,3-dicarbonyl compound to the polyurea and/or polyurethane polyurea reaction mixture before or during the reaction. U.S. Pat. No. 5,556,889 describes addition of at least one epoxidized native fatty oil to the reaction mixture after glycolysis. U.S. Pat. No. 5,357,006 describes a process for the preparation of recyclate polyols obtained by glycolysis of polyurethanes and/or polyurea-polyurethanes by addition of monofunctional and/or difunctional glycidyl ethers over the entire course of the reaction. U.S. Pat. No. 5,300,530 describes a process in which an alkylene oxide (propylene oxide) is added to the glycolysis polyol products in a molar ratio of <1 mole of alkylene oxide per mole of active amine hydrogen atom in the glycolysis polyol products. U.S. Pat. No. 4,110,266 discloses a process for decomposing polyurethane using glycols, polyols, amines, and/or ammonia and converting the decomposition mixture into a product substantially free of primary and secondary amines and containing an increased amount of polyols by reacting the decomposition mixture with an excess of alkylene oxide with respect to active hydrogen atoms of the amines for a period sufficient to convert the amines to polyols and forming a product mixture substantially free of primary and secondary amines. It is preferred that more than one and up to 3 moles of alkylene oxide is employed per mole of active hydrogen atom of the amines. Regardless of all these modifications, the final chemolysis products have extremely broad molecular weight distributions and only a limited amount can be used in a mixture with virgin polyols to prepare polyurethanes with useful properties.

U.S. Pat. No. 5,274,004 to van der Wal discloses a process for converting a polyurethane polymer to polyol, and the use of the polyol to prepare a fresh polyurethane polymer. The process is limited to the use of polyether-based polyurethanes. There is no suggestion to use a mixture of polyurethanes and other materials such as are found in light ASR. The process is also limited to an alkanolamine (more specifically diethanolamine) as a chemolysis liquid reactant. The process requires the reaction of the polyurethane with a liquid mixture of an alkanolamine and a metal hydroxide to create an intermediate product. The intermediate product is treated with an alkylene oxide to produce polyol.

Another challenge for recycling in general and especially polyurethanes is obtaining a sustainable amount of the scrap and a sustainable quality of the scrap. In the case of the post-consumer scrap, there are several challenges including collection and storage, transportation of usually light materials to long destinations, classification and characterization of materials without any control of their history during their service life and their history as scrap. Scrap may be contaminated with other organic and inorganic materials including some potentially hazardous materials. This may explain why only a limited amount and mostly post-industrial polyurethane scrap materials have been recycled so far utilizing chemolysis processes [Rasshofer, W. and Weigand, E., "Automotive Polyurethanes—Advances in Plastics Recycling," Volume 2, (2001), Technomic Publishing Co., Inc., Lancaster, Pa. 17604, USA, pp.66–129].

The "light ASR" is one of the automotive shredder residue (ASR) streams routinely generated in most downstream automotive shredder processes. Over 3 million tons of ASR has been generated per year by over 200 automotive shredders in the U.S. and Canada [Recycling Today, July 1995, p.60]. ASR contains approximately 25% light ASR [SAE Technical Paper Series 1999-01-0670]. The compositions of ASR streams are relatively consistent and the composition of the specific light ASR depends mostly on the type of shredding process ("dry," "wet," "damp"), the particle size of shredded material, and the type of the downstream separation process (flotation, rotating trommel or a multiple level vibratory screen) [SAE Technical Paper Series 1999-01-0670]. There are many relatively simple processes that may be utilized to upgrade urethane content in these streams and eliminate contaminants such as heavy metals. Simple size reduction by secondary shredding and washing with industrial detergents significantly affects the percent of combustibles in the light ASR. There are reported processes specifically designed to separate flexible foams from ASR such as U.S. Pat. No. 5,443,157 that describes a system for separation and cleaning of a polyurethane foam from ASR.

SUMMARY OF THE INVENTION

The present invention relates to a process of chemically recycling polyurethane-containing scrap. In a first step of the process, polyurethane-containing scrap is subjected to a chemolysis reaction to produce chemolysis polyol products. In a second step of the process, the chemolysis polyol products are used as initiators in a reaction with alkylene oxide to produce oxyalkylated polyols for preparing polyurethanes.

DETAILED DESCRIPTION OF THE INVENTION

Figure 1:
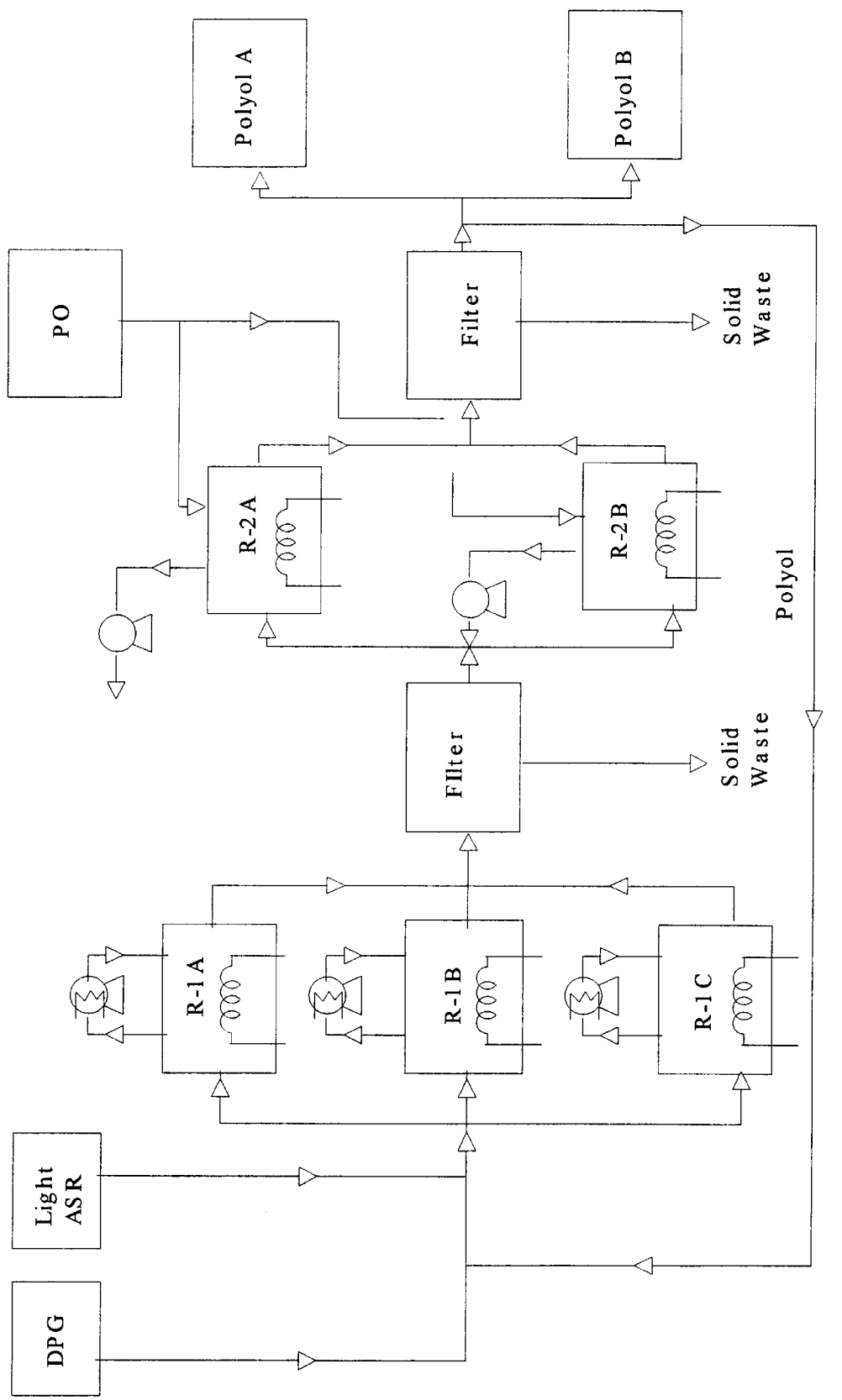
FIG. 1 is a diagram of a preferred process of chemically recycling polyurethane-containing scrap according to the invention.

The invention relates to a process of chemically recycling polyurethane-containing scrap. The process can be used on practically any type of polyurethane-containing scrap, such as post-consumer polyurethane-containing scrap or industrial polyurethane-containing scrap, or mixtures of different types of polyurethane-containing scrap. For example, the scrap can be a cellular or solid polyurethane monoscrap or a polyurethane-containing composite material such as an industrial or post-consumer scrap from automotive trim parts. In a preferred embodiment of the invention, the scrap is a light fraction separated from automotive shredder residue, which is usually referred to as "light ASR", or a flexible foam separated from ASR. The light ASR is usually composed primarily of flexible polyurethane foam.

In a first step of the process, polyurethane-containing scrap is subjected to a chemolysis reaction to produce chemolysis polyol products. The chemolysis reaction will produce chemolysis products that are primarily polyols such as original polyols and isocyanate-containing polyols, but the chemolysis products will usually also include small amounts of other materials such as amines, residual reactants and catalyst. Thus, the term "chemolysis polyol products", as used herein, is meant to include the polyol products without excluding any other materials which may be if present in the products. Preferably, the average equivalent weight of the chemolysis polyol products is between about 100 and about 500, more preferably between about 200 and about 500, and most preferably between about 300 and about 500.

The chemolysis reaction can be any type of chemolysis reaction suitable for depolymerizing the polyurethane-containing scrap, such as glycolysis, hydrolysis or aminolysis. In a preferred embodiment, the chemolysis reaction is a glycolysis reaction. Any suitable glycol can be used in the glycolysis reaction. Preferably, the glycol is a low molecular weight glycol such as dipropylene glycol, diethylene glycol, propylene glycol, ethylene glycol, or mixtures of these glycols. Any suitable catalyst can be used in the glycolysis reaction, such as sodium hydroxide, potassium hydroxide, sodium alcoholate, potassium alcoholate, or mixtures of these catalysts.

Preferably, the weight ratio of polyurethane-containing scrap to glycol used in the glycolysis reaction is between about 1:1 and about 14:1, more preferably between about 7:1 and about 14:1, and most preferably about 14:1. To the best of the inventor's knowledge, glycolysis was never before reported with such a low amount of glycol. It has been found that using a low amount of glycol relative to the amount of polyurethane-containing scrap produces a low amount of amines in the glycolysis product. It is believed that most of the free amines generated during glycolysis are reacted further with urethane groups (aminolysis) resulting in lower molecular weight oligomers. U.S. Pat. No. 5,274,004 discloses the weight ratio of scrap polyurethane to liquid mixture of 15:1 and higher. However, an alkanolamine (diethanolaniine) is used as a chemolysis reactant. Diethanolamine leads to a combination of aminolysis and glycolysis reactions. This is not a straight glycolysis process.

In some embodiments, the process includes a combination of two or more of these chemolysis reactions, by including in the reaction mixture at least two chemolysis reactants selected from glycols, amines, and water. Preferably, the amines are diamines, and more preferably low molecular weight diamines.

In a preferred embodiment of the process, a portion of the oxyalkylated polyol product (e.g., up to about 25% by weight of the product) is returned back and used as a reactant in the chemolysis reaction. Addition of the polyol product to the reactant mixture can increase the rate of chemolysis by increasing the amount of solvent available.

In a second step of the process, the chemolysis polyol products are used as initiators in a reaction with alkylene oxide to produce oxyalkylated polyols for preparing polyurethanes. Any suitable alkylene oxide, or mixtures of alkylene oxides, can be used in the alkoxylation (oxyalkylation) reaction. Preferably, the alkylene oxide is propylene oxide alone or a mixture of propylene oxide and ethylene oxide. A mixture of propylene oxide and ethylene oxide can be used, e.g., in a weight ratio between about 99:1 and about 60:40, and preferably between about 99:1 and about 85:15.

The amount of alkylene oxide used in the reaction is sufficient to narrow the molecular weight distribution of the resulting oxyalkylated polyol products. Preferably, at least about two equivalents of alkylene oxide are reacted per one equivalent of chemolysis polyol products. The processes described in U.S. Pat. Nos. 4,110,266 and 5,300,530 use much smaller amounts of alkylene oxide, and the alkylene oxide is added just for the removal of amines. A relatively narrow molecular weight distribution is a desirable property of polyols for polyurethanes, providing advantages such as increased predictability and more control of the final properties. Preferably, the average equivalent weight of the oxyalkylated polyols is between about 200 and about 5,000, and more preferably between about 500 and about 2000.

The oxyalkylated polyol products can be used to prepare polyurethanes by reacting the polyol with isocyanate. For example, the polyurethanes can be prepared utilizing aromatic or aliphatic isocyanates, and/or NCO-containing isocyanate derivatives such as prepolymers or quasi-prepolymers. The polyurethanes can be prepared utilizing the oxyalkylated polyol products in mixture with other polyols and/or chain extenders. The polyurethanes can be cellular or non-cellular, and they can vary from soft and/or elastomeric to rigid and/or hard. Typically, the glass transition temperature of the polyurethanes will be in the range from −100° C. to +120° C.

A preferred chemical recycling process in accordance with the invention is shown in FIG. 1. Light ASR is added in portions to dipropylene glycol in reactors R-1A, R-1B and R-1C that operate at atmospheric pressure, preferably at a final ratio of about 14:1 light ASR:dipropylene glycol. The light ASR is subjected to a glycolysis process in the reactors to create glycolysis products which are primarily polyols.

The glycolysis products are filtered and solid waste is removed. Then, in reactors R-2A and R-2B, supplied with pressurized inert gas and vacuum, the glycolysis products are used as initiators in reaction with propylene oxide and/or ethylene oxide to prepare novel polyols (polyols A and B in the illustrated embodiment). The products are again filtered and solid waste is removed. Optionally, up to 25% of the polyol product is returned back and used as a reactant along with the light ASR and dipropylene glycol. It is recognized that the process could also be carried out using a single reactor of the R-2A type (pressurized and supplied with a vacuum), instead of using three reactors in a first step and two reactors in a second step as shown.

The following are some major elements of preferred embodiments of the invention:

Chemolysis can be carried out utilizing actual post-consumer scrap, such as light fraction separated from automotive shredder residue (ASR) or foam separated from ASR—not just a model polyurethane scrap or industrial polyurethane scrap as described in most patents. Light ASR fraction contains polyurethane foams from different vehicle models produced by different manufacturers. These foams were manufactured utilizing different types of polyols (polyether and polyester types) and different types of isocyanates from different suppliers. Polyurethane foams in light ASR contain fabrics and other types of fluff materials that may not be based on polyurethanes. Polyester-, nylon-, polyurea-, and similar materials in the fluff will also be transformed by the present process into liquid oligomers and be a component of chemolysis products. Unreacted materials present in the fluff will be separated from the liquid products by filtration. There are only a few reports describing chemolysis of post-consumer scrap. However, these are mono-scrap materials (only rigid polyurethane foam or only RIM polyurethane, etc.) [Weigand, E., Bayer Technical Information; Rasshofer, W. and Weigand, E.,"Automotive Polyurethanes—Advances in Plastics Recycling," Volume 2, (2001), Technomic Publishing Co., Inc., Lancaster, Pa. 17604, USA, pp.66–129].

The present invention does not use chemolysis products only directly as "polyols" for preparation of polyurethanes without modification or with minimum modification. Some patents describe"elimination" of free amines prior to utilization in polyurethanes. There is one patent, U.S. Pat. No. 5,300,530, that specifically describes reaction of glycolysis products with less than one mole of propylene oxide and/or ethylene oxide per one equivalent of active hydrogen, just to eliminate primary amines. According to U.S. Pat. No. 4,110,266, it is preferred that more than one and up to 3 moles of alkylene oxide is added to glycolyzed polyol product per mole of active hydrogen atom of the amines to transform primary and secondary amines into polyols. In most cases, these"polyols" can be used only in combination with"virgin" polyols and usually not more than 20%. The present invention uses the chemolysis products as initiators in reaction with propylene oxide and/or ethylene oxide to prepare novel polyols with varying equivalent weights for various applications (primarily flexible foams, but also semi-rigid foams, rigid foams, elastomers, coatings, adhesives, sealants, etc.). The polyols are novel because of the unique composition of the light ASR; these polyols will contain, e.g., different aromatic groups, ether linkages, and ester linkages. The catalysts(s) used for glycolysis can serve as catalyst(s) in the propoxylation/ethoxylation reaction, so no additional catalyst is needed for synthesis of these novel polyols. Propylene oxide reacts with the shortest chain in the reaction mixture resulting in polyols with relatively narrow molecular weight distribution. Based on equivalent weight of initiators, it is relatively easy to calculate the amount of propylene oxide and ethylene oxide needed for preparing a specific polyol. Ethylene oxide will be mostly used for preparation of polyols with equivalent weight higher than 1,000 (5 to 15% ethylene oxide per 95 to 85% propylene oxide). In most cases, ethylene oxide will be used as a "block" at the end of the chain (block co-polymer to end the chain and increase the concentration of primary hydroxyl groups in the polyol). Polyols with equivalent weight of 1,000 and lower will mostly be prepared with 100% propylene oxide. The polyols of the invention will have unique properties because of their aromatic content and presence of both ether and ester linkages. The reaction of the chemolysis products with the propylene oxide and/or ethylene oxide creates novel polyols with well-defined characteristics. The polyols are stable. Specific polyols can be prepared for specific applications.

Light ASR is in general heterogenous. However, different fractions of light ASR have predictable compositions (e.g., light ASR separated from automotive shredder residue by a specific process has properties that are more defined and predictable). Consequently, there is some control of the properties of the light ASR. Additionally, the propoxylation and/or ethoxylation reaction of the present invention narrows the molecular weight distribution of the polyol products, making them more predictable and bringing more control of the final properties. As a result of the increased control provided by the invention, it can be predicted that the final polyol product will have a certain defined range of properties.

EXAMPLES 1–5

The light ASR was shredded to particle sizes of 2–3 cm and 1 cm prior to washing and glycolysis. The light ASR was washed in a laundry machine utilizing 1 part by weight of industrial detergent Calsoft F-20 (Pilot Chemical Company) or Tween 20 (ICI) per 100 parts by weight of scrap. The percent of combustibles in the scrap based on dry material are shown in Table 1.

TABLE 1

| Percent of combustibles in light ASR | | |
|---|---|---|
| | Weight loss by combustion (%) | |
| Designation | Particle size of light ASR 2–3 cm | Particle size of light ASR 1 cm |
| Unwashed scrap | 80.3% | 88.3% |
| Washed scrap | 94.2% | 99.0 |

In examples #1–3, unwashed scrap with particle size of 2–3 cm was used as input material. In examples #4 and #5, the scrap was washed prior to glycolysis. Materials used in examples #1–5, as well as synthesis conditions, are shown in Table 2. The properties of glycolyzed products in examples #3–5 are shown in Tables 2 and 3 and FIG. 2. The scrap glycolyzed in examples #3–5 was dried at 105° C. until constant dry weight before glycolysis. The glycolysis was carried out in a four-neck laboratory glass reactor (2 liter size) equipped with dry nitrogen inlet-outlet, mechanical mixer, reflux condenser, thermocouple, temperature control unit, and heating mantle. Potassium hydroxide was utilized as a catalyst. A small amount of scrap was added to a mixture of glycol and potassium hydroxide at room temperature before heating. With an increase in temperature, the scrap started to dissolve, and the remaining amount of scrap was added in small portions through a neck used for thermocouple. Glycolysis was carried out at 200° C.–210° C. by addition of the scrap to preheated glycol in small portions to maintain reaction mixture with a sufficient amount of solvent. After all of the scrap was dissolved and the product was cooled to room temperature, the product weight was determined. In the case of propylene glycol as reactant, the product was dissolved in acetone and filtrated for the determination of the percent of solubles. Afterwards, the acetone was removed from the acetone soluble products by distillation at atmospheric pressure. The residual traces of acetone were removed by overnight heating at 70–80° C. under vacuum of 5 mm Hg. Acetone was removed from acetone-insoluble residue by heating in an oven for 24 hours at 105° C. Amounts of combustible materials were determined for acetone-insoluble residue as weight loss at 700° C. In the case of acetone-soluble fraction, the following analysis were carried out after distillation: OH content and alkalinity (ASTM D2849); total amine concentration (Huntsman Procedure, Jeffamines); and viscosity (Brookfield Viscometer).

Figure 2:
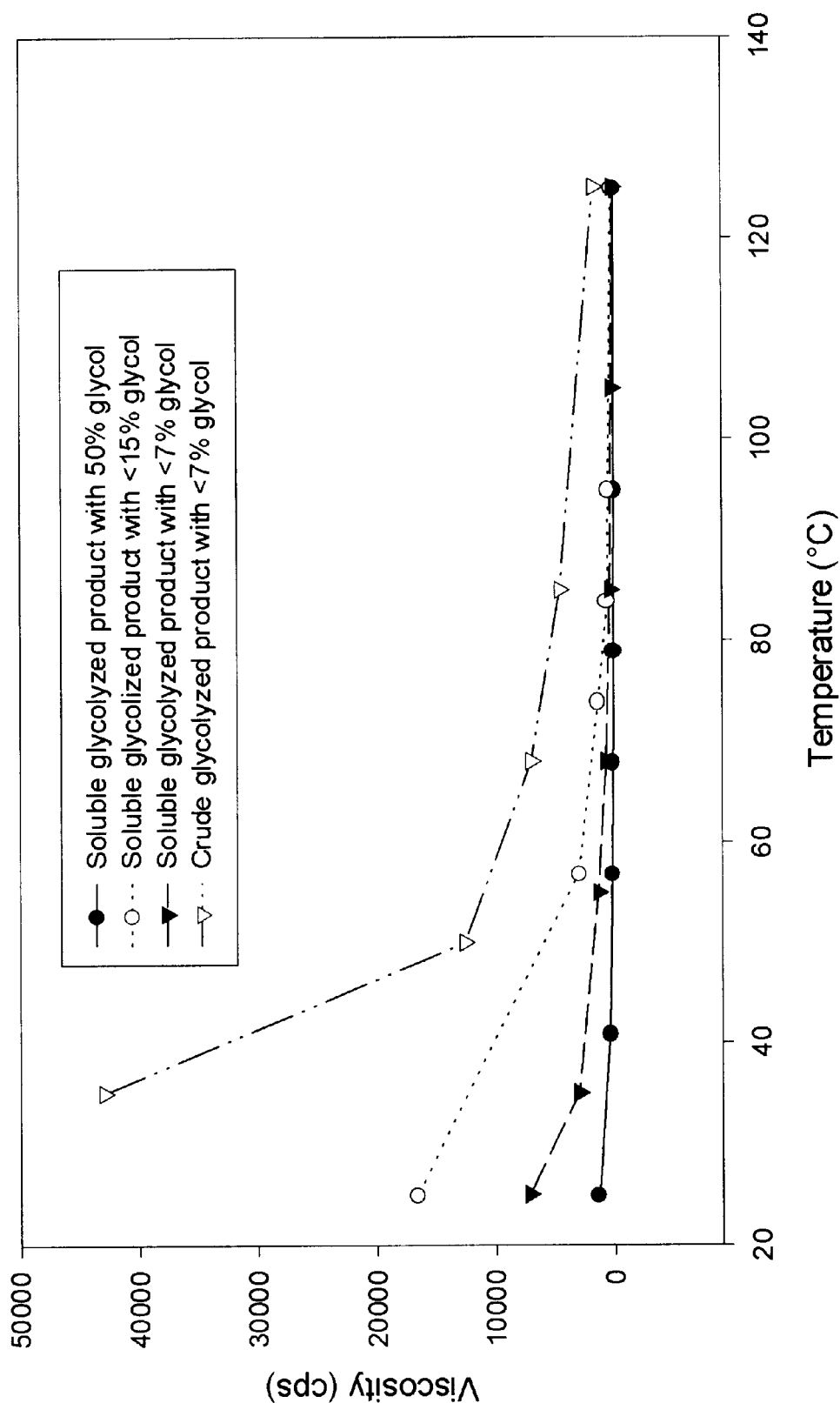
FIG. 2 is a plot of viscosity versus temperature of different glycolized products which can be used as initiators for oxyalkylation according to the invention.

Additional viscosity measurements not shown in Tables 2 and 3 were done at different temperatures between 35° C. and 125° C. FIG. 2 shows the plots of viscosity versus temperature for these glycolyzed products. All the products have a low viscosity at a temperature around 110°–120° C., the temperature range of a typical oxyalkylation reaction. As a result, the glycolyzed products are well suited for use as initiators in the oxyalkylation reaction.

In Tables 4–6 are shown amounts of propylene oxide and/or ethylene oxide required in oxyalkylation of initiators prepared in examples #3–5 in order to obtain the desired average equivalent weight of polyols for polyurethanes. Those trained in the field of the invention know how to do this synthesis.

TABLE 2

Glycolysis of light ASR using different glycols

| Designation | Ex. #1 | Ex. #2 | Ex. #3 | Ex. #4 | Ex. #5 |
| --- | --- | --- | --- | --- | --- |
| Amount of scrap (g) | 200 | 600 | 600 | 470.7 | 1409.7 |
| Scrap dried before glycolysis | No | No | Yes | Yes | Yes |
| Scrap washed before glycolysis | No | No | No | Yes | Yes |
| Scrap particle size (cm) | 2–3 | 2–3 | 2–3 | 2–3 | ~1 |
| Ethylene glycol (g) | 200 | — | — | — | |
| Diethylene glycol (g) | — | 600 | — | — | |
| Dipropylene glycol (g) | — | — | 600 | 80.2 | 100.1 |
| Potassium hydroxide (g) | 4 | 6 | 6 | 4.8 | 7.1 |
| Total reactants (g) | 404 | 1206 | 1206 | 555.7 | 1516.9 |
| Yield (g) | 340 | 1051 | 1187 | 524 | 1467 |
| Yield (%) | 84 | 87 | 98 | 94 | 97 |
| Volatiles loss (%) | 16 | 13 | 2 | 6 | 3 |
| Scrap/glycol weight ratio | 1/1 | 1/1 | 1/1 | 5.8/1 | 14.08/1 |
| Glycol based on total reactants (%) | 50 | 50 | 50 | <15 | <7 |
| Reaction conditions | | | | | |
| Temperature (° C.) | 200–210 | 200–210 | 200–210 | 200–210 | 200–210 |
| Reaction time (hours) | 2 | 2 | 2 | 4 | 10 |
| Product characterization | | | | | |
| Acetone-soluble products (%) | — | — | 80.8 | 87.0 | 80.7 |
| Acetone-insoluble residue (%) | — | — | 19.0 | 12.5 | 18.6 |
| Weight loss during filtration and drying operation (%) | — | — | 0.2 | 0.5 | 0.7 |
| Weight loss of acetone-insoluble residue at 700° C. (%) | — | — | 23.5 | 86.5 | 93.7 |
| Viscosity of acetone-soluble product at 25° C. (cps) | — | — | 1300 | 16600 | 7150 |
| OH of acetone-soluble product (mg KOH/g) | — | — | 521 | 238 | 162.5 |
| Alkalinity of acetone-soluble product (mg KOH/g) | — | — | 1.1 | 1.0 | 1.0 |
| Total amines of acetone-soluble product (mg KOH/g) | — | — | 58.3 | 30.6 | 50.0 |

TABLE 3

Viscosity at various temperatures of crude glycolysis products and acetone-soluble glycolysis products of light ASR

| | Viscosity (cps) | | | |
| --- | --- | --- | --- | --- |
| Temperature (° C.) | Acetone-soluble product from Ex. #3 | Acetone-soluble product from Ex. #4 | Acetone-soluble product from Ex. #5 | Crude glycolysis product from Ex. #5 |
| 25 | 1300 | 16600 | 7150 | — |
| 35 | — | — | 3000 | 43000 |
| 125 | 38 | 213 | 125 | 1700 |

TABLE 4

Examples of amounts of propylene oxide and ethylene oxide needed to prepare polyols with different equivalent weights utilizing glycolysis product from Ex. #3 (see Table 2)

| Designation | Polyol #1 | Polyol #2 | Polyol #3 | Polyol #4 |
| --- | --- | --- | --- | --- |
| Initiator equivalent weight | 108 | 108 | 108 | 108 |
| Polyol equivalent weight | 500 | 1000 | 2000 | 2000 |
| Propylene oxide/ethylene oxide weight ratio | 100/0 | 100/0 | 100/0 | 85/15 |
| Amount of propylene oxide per one equivalent of initiator | 392 parts by weight (6.8 equivalents) | 892 parts by weight (15.4 equivalents) | 1,892 parts by weight (32.6 equivalents) | 1,608 parts by weight (27.7 equivalents) |

| Amount of ethylene oxide per one equivalent of initiator | — | — | — | 284 parts by weight (6.5 equivalents) |

TABLE 5

Examples of amounts of propylene oxide and ethylene oxide needed to prepare polyols with different equivalent weights utilizing glycolysis product from Ex. #4 (see Table 2)

| Designation | Polyol #5 | Polyol #6 | Polyol #7 | Polyol #8 |
|---|---|---|---|---|
| Initiator equivalent weight | 236 | 236 | 236 | 236 |
| Polyol equivalent weight | 500 | 1000 | 2000 | 2000 |
| Propylene oxide/ethylene oxide weight ratio | 100/0 | 100/0 | 100/0 | 85/15 |
| Amount of propylene oxide per one equivalent of initiator | 264 parts by weight (4.6 equivalents) | 764 parts by weight (13.2 equivalents) | 1,764 parts by weight (30.4 equivalents) | 1,499 parts by weight (25.8 equivalents) |
| Amount of ethylene oxide per one equivalent of initiator | — | — | — | 265 parts by weight (6.0 equivalents) |

TABLE 6

Examples of amounts of propylene oxide and ethylene oxide needed to prepare polyols with different equivalent weights utilizing glycolysis product from Ex. #5 (see Table 2)

| Designation | Polyol #9 | Polyol #10 | Polyol #11 | Polyol #12 |
|---|---|---|---|---|
| Initiator equivalent weight | 345 | 345 | 345 | 345 |
| Polyol equivalent weight | 500 | 1000 | 2000 | 2000 |
| Propylene oxide/ethylene oxide weight ratio | 100/0 | 100/0 | 100/0 | 85/15 |
| Amount of propylene oxide per one equivalent of initiator | 155 parts by weight (2.7 equivalents) | 655 parts by weight (11.3 equivalents) | 1,655 parts by weight (28.5 equivalents) | 1,407 parts by weight (24.3 equivalents) |
| Amount of ethylene oxide per one equivalent of initiator | — | — | — | 248 parts by weight (5.6 equivalents) |

EXAMPLE 6

(Hypothetical)

The glycolyzed products of Examples 1–5 could be used as initiators in reaction with propylene oxide and/or ethylene oxide to prepare propoxylated and/or ethoxylated polyol products. The polyol products could then be used to prepare a polyurethane foam. For example, a flexible polyurethane foam could be prepared utilizing the approximate formulation shown in Table 7.

TABLE 7

Formulations of polyurethane foams based on polyols that can be prepared by oxyalkylation of glycolyzed products as initiators

| | | Type of PU foam | | |
|---|---|---|---|---|
| Components | Supplier/Origin | Conventional Slabstock Foam | All-MDI Based HR Foam | TDI-Based HR Foam |
| Polyol #10 (Table 6) | Initiator of 345 equivalent weight-propoxylated | 100 g | — | 20 g |
| Polyol #8 (Table 5) | Initiator of 236 equivalent weight-propoxylated/ ethoxylated | — | 100 g | 80 g |
| Water | | 3.9 g | 3.4 | 3.5 g |
| Niax L-620 (Surfactant) | Osi-Crompton | 1.0 g | — | — |
| Tegostab B-4113 (Surfactant) | Goldschmidt | — | 1.0 g | — |
| Tegostab B-8681 (Surfactant) | Goldschmidt | — | — | 0.9 g |
| Dimethylethanol-amine (Catalyst) | | 0.18 g | — | — |
| Diethanol Amine, 85% (Catalyst) | | — | 0.8 g | 0.7 g |
| Stannous Octoate (Catalyst) | | 0.23 g | — | — |
| Dabco 33-LV (Catalyst) | Air Products | — | 0.55 g | 0.35 g |
| Niax A-1 (Catalyst) | Osi-Crompton | — | 0.1 g | — |
| Dibutyltin Dilaurate | | — | — | 0.25 g |

TABLE 7-continued

Formulations of polyurethane foams based on polyols that can be prepared by oxyalkylation of glycolyzed products as initiators

| Components | Supplier/Origin | Conventional Slabstock Foam | All-MDI Based HR Foam | TDI-Based HR Foam |
|---|---|---|---|---|
| (Catalyst) | | | | |
| Flame retardant | | — | — | 5 g |
| Toluene Diisocyanate 80/20 Isomer mixture | | 100–115 Isocyanate Index | — | 105–115 isocyanate Index |
| Specflex NE-106 (MDI-isocyanate) | Dow Chemicals | — | 80–110 Isocyanate Index | — |

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A process of chemically recycling light ASR polyurethane-containing scrap comprising the steps of:
    subjecting light ASR polyurethane-containing scrap to a chemolysis reaction to produce chemolysis polyol products of at least one polyurethane based foam and at least one material selected from the group consisting of an ester based polymeric material, a urea based polymeric material, and an amide based polymeric material; and
    using the chemolysis polyol products as initiators in a reaction with alkylene oxide to produce oxyalkylated polyols for preparing polyurethanes.
2. A process according to claim 1 wherein the average equivalent weight of the oxyalkylated polyols is between about 200 and about 5,000.
3. A process according to claim 1 wherein at least about two equivalents of alkylene oxide are reacted per one equivalent of initiator.
4. A process according to claim 1 wherein the chemolysis reaction is a glycolysis reaction.
5. A process according to claim 4 wherein the weight ratio of light ASR polyurethane-containing scrap to glycol used in the glycolysis reaction is between about 1:1 and about 14:1.
6. A process according to claim 5 wherein the weight ratio of light ASR polyurethane-containing scrap to glycol used in the glycolysis reaction is between about 7:1 and about 14:1.
7. A process according to claim 4 wherein the glycol used in the glycolysis reaction is selected from the group consisting of dipropylene glycol, diethylene glycol, propylene glycol, ethylene glycol, and mixtures thereof.
8. A process according to claim 4 wherein the catalyst for the glycolysis reaction is selected from the group consisting of sodium hydroxide, potassium hydroxide, sodium alcoholate, potassium alcoholate, and mixtures thereof.
9. A process according to claim 1 wherein the average equivalent weight of the chemolysis polyol products is between about 100 and about 500.
10. A process according to claim 1 wherein a portion of the oxyalkylated polyol product is returned back and used as a reactant in the chemolysis reaction.
11. A process according to claim 1 wherein the alkylene oxide is selected from the group consisting of propylene oxide, and a mixture of propylene oxide and ethylene oxide.
12. A process according to claim 11 wherein the alkylene oxide comprises a mixture of propylene oxide and ethylene oxide in a weight ratio between about 99:1 and about 85:15.
13. A process according to claim 1 wherein the chemolysis reaction uses a mixture of at least two chemolysis reactants selected from the group consisting of glycols, amines, and water.
14. A process according to claim 1 comprising the additional step of reacting the oxyalkylated polyols with isocyanate to produce a polyurethane.
15. An oxyalkylated polyol product, produced by the process of claim 1, for preparing a polyurethane.
16. A polyurethane containing an oxyalkylated polyol product produced by the process of claim 1.
17. A process of chemically recycling light ASR polyurethane-containing scrap comprising the steps of:
    subjecting light ASR polyurethane-containing scrap to a glycolysis reaction to produce glycolysis polyol products of at least one polyurethane based foam and at least one material selected from the group consisting of an ester based polymeric material, a urea based polymeric material, and an amide based polymeric material; and
    using the glycolysis polyol products as initiators in a reaction with alkylene oxide to produce oxyalkylated polyols for preparing polyurethanes, wherein at least about one equivalent of alkylene oxide is reacted per one equivalent of initiator.
18. A process of chemically recycling light ASR polyurethane-containing scrap for preparing polyurethanes comprising the steps of:
    subjecting light ASR polyurethane-containing scrap to a chemolysis reaction to produce chemolysis polyol products of at least one polyurethane based foam and at least one material selected from the group consisting of an ester based polymeric material, a urea based polymeric material, and an amide based polymeric material; and
    using the chemolysis polyol products as initiators in a reaction with alkylene oxides to produce oxyalkylated polyols; and
    preparing polyurethanes with the oxyalkylated polyols.
19. A process according to claim 1 wherein at least about one equivalent of alkylene oxide is reacted per one equivalent of initiator.
20. A process according to claim 1 wherein the oxyalkylated polyols have a complex chemical composition and defined average equivalent weights.
21. The process of claim 1 wherein the light ASR is comprised of ASR foam.

* * * * *